(12) United States Patent
Lewis et al.

(10) Patent No.: US 10,185,486 B2
(45) Date of Patent: Jan. 22, 2019

(54) METHOD FOR ONE-CLICK SUBSCRIBING TO MULTIPLE CHANNELS OF INFORMATION ON A SINGLE TOPIC

(71) Applicant: Google Inc., Mountain View, CA (US)

(72) Inventors: Justin Lewis, Marina del Rey, CA (US); Michael Patrick Schneider, Venice, CA (US)

(73) Assignee: Google LLC, Mountain View, CA (US)

( * ) Notice: Subject to any disclaimer, the term of this patent is extended or adjusted under 35 U.S.C. 154(b) by 251 days.

(21) Appl. No.: 14/988,470

(22) Filed: Jan. 5, 2016

(65) Prior Publication Data

US 2016/0170623 A1     Jun. 16, 2016

Related U.S. Application Data

(63) Continuation of application No. 13/777,086, filed on Feb. 26, 2013, now Pat. No. 9,253,541.

(51) Int. Cl.

| | |
|---|---|
| *G06F 3/0484* | (2013.01) |
| *G06F 3/0482* | (2013.01) |
| *H04N 21/2543* | (2011.01) |
| *H04N 21/258* | (2011.01) |
| *H04N 21/2665* | (2011.01) |
| *H04N 21/4782* | (2011.01) |
| *H04N 21/61* | (2011.01) |
| *H04N 21/658* | (2011.01) |

(Continued)

(52) U.S. Cl.
CPC ........ *G06F 3/04847* (2013.01); *G06F 3/0482* (2013.01); *G06F 3/04842* (2013.01); *H04N 21/2543* (2013.01); *H04N 21/25891* (2013.01); *H04N 21/2665* (2013.01); *H04N 21/4782* (2013.01); *H04N 21/6125* (2013.01); *H04N 21/6175* (2013.01); *H04N 21/6582* (2013.01); *H04N 21/84* (2013.01); *G06F 3/0484* (2013.01); *G06F 17/30861* (2013.01); *G06F 17/30997* (2013.01); *G06Q 10/10* (2013.01); *H04L 29/0809* (2013.01); *H04L 51/00* (2013.01); *H04N 21/25875* (2013.01)

(58) Field of Classification Search
CPC .................. G06F 3/04842; G06F 3/04847
See application file for complete search history.

(56) References Cited

U.S. PATENT DOCUMENTS

| | | |
|---|---|---|
| 4,769,772 A | 9/1988 | Dwyer |
| 5,960,411 A | 9/1999 | Hartman et al. |

(Continued)

FOREIGN PATENT DOCUMENTS

| | | |
|---|---|---|
| WO | 2005055603 A1 | 6/2005 |

*Primary Examiner* — Eric J. Bycer
(74) *Attorney, Agent, or Firm* — Lowenstein Sandler LLP (57) ABSTRACT

A subscription to multiple channels of information on a single topic is performed. A topic of interest is received via a user interface. In response to receiving the topic of interest, a plurality of channels associated with the topic of interest is determined. A user interface is provided to present an indication of the plurality of channels and a user interface element is provided to facilitate a user subscription to the plurality of channels associated with the topic of interest without having to subscribe separately to each channel. A user selection of the plurality of channels associated with the topic of interest is received and the user is subscribed to the plurality of channels in response to the received user selection.

20 Claims, 5 Drawing Sheets

(51) Int. Cl.
*H04N 21/84* (2011.01)
*H04L 29/08* (2006.01)
*G06Q 10/10* (2012.01)
*G06F 17/30* (2006.01)
*H04L 12/58* (2006.01)

(56) References Cited

U.S. PATENT DOCUMENTS

| | | | |
|---|---|---|---|
| 6,104,398 A | 8/2000 | Cox, Jr. et al. | |
| 7,412,534 B2 * | 8/2008 | Tsang | G06Q 10/00 709/226 |
| 7,596,797 B1 * | 9/2009 | Kapner, III | H04N 5/44543 725/44 |
| 7,783,592 B2 | 8/2010 | Armstrong et al. | |
| 7,979,803 B2 | 7/2011 | Kim et al. | |
| 8,190,997 B2 | 5/2012 | Shellen et al. | |
| 8,230,347 B2 | 7/2012 | Cwajbaum | |
| 8,230,361 B2 | 7/2012 | Goldberg et al. | |
| 8,589,418 B1 * | 11/2013 | Kane | G06Q 30/02 707/749 |
| 8,626,794 B2 | 1/2014 | Liao et al. | |
| 8,725,770 B2 | 5/2014 | Koide et al. | |
| 8,850,490 B1 | 9/2014 | Thomas et al. | |
| 9,253,541 B2 | 2/2016 | Lewis et al. | |
| 2002/0002488 A1 | 1/2002 | Muyres et al. | |
| 2002/0004744 A1 | 1/2002 | Muyres et al. | |
| 2003/0095153 A1 | 5/2003 | Bosma et al. | |
| 2004/0111478 A1 | 6/2004 | Gross et al. | |
| 2006/0212904 A1 | 9/2006 | Klarfeld et al. | |
| 2006/0271876 A1 | 11/2006 | Holmes et al. | |
| 2006/0277481 A1 | 12/2006 | Forstall et al. | |
| 2007/0038712 A1 | 2/2007 | Affronti et al. | |
| 2007/0077921 A1 | 4/2007 | Hayashi et al. | |
| 2008/0082941 A1 | 4/2008 | Goldberg et al. | |
| 2008/0109529 A1 | 5/2008 | Story | |
| 2008/0141136 A1 | 6/2008 | Ozzie et al. | |
| 2008/0320139 A1 | 12/2008 | Fukuda et al. | |
| 2009/0013266 A1 | 1/2009 | Gandhi et al. | |
| 2009/0019063 A1 | 1/2009 | Gandhi et al. | |
| 2009/0043907 A1 | 2/2009 | Peterson et al. | |
| 2009/0083761 A1 | 3/2009 | Mully | |
| 2009/0150406 A1 | 6/2009 | Giblin | |
| 2009/0322790 A1 | 12/2009 | Behar et al. | |
| 2010/0042948 A1 | 2/2010 | Kim et al. | |
| 2010/0049603 A1 | 2/2010 | Peterson et al. | |
| 2010/0076818 A1 | 3/2010 | Peterson et al. | |
| 2010/0082650 A1 | 4/2010 | Wong | |
| 2010/0125584 A1 | 5/2010 | Navas | |
| 2010/0145422 A1 * | 6/2010 | Seymour | A61N 1/05 607/116 |
| 2011/0137894 A1 | 6/2011 | Narayanan et al. | |
| 2011/0179020 A1 | 7/2011 | Ozzie et al. | |
| 2011/0197146 A1 | 8/2011 | Goto et al. | |
| 2012/0054278 A1 | 3/2012 | Taleb et al. | |
| 2012/0124073 A1 * | 5/2012 | Gross | G06F 17/30873 707/767 |
| 2012/0304219 A1 | 11/2012 | Olague et al. | |
| 2014/0337139 A1 | 11/2014 | Thomas et al. | |

* cited by examiner

METHOD FOR ONE-CLICK SUBSCRIBING TO MULTIPLE CHANNELS OF INFORMATION ON A SINGLE TOPIC

CROSS-REFERENCE TO RELATED APPLICATIONS

This patent application is a continuation of U.S. Non-Provisional application Ser. No. 13/777,086 (now U.S. Pat. No. 9,253,541), filed Feb. 26, 2013 and entitled "METHOD FOR ONE-CLICK SUBSCRIBING TO MULTIPLE CHANNELS OF INFORMATION ON A SINGLE TOPIC," which is incorporated herein by reference for all purposes.

TECHNICAL FIELD

Embodiments of the present disclosure relate to the field of video watching services and, more particularly, to a method for one-click subscribing to multiple channels of information on a single topic.

BACKGROUND

On the Internet, content hosting services or other applications allow users to upload, view, and share data content. Such data content may include audio clips, movie clips, TV clips, and music videos, as well as content such as blogs, social media pages, short original videos, pictures, photos, articles, avatars, software programs, games, etc.

Data content can be provided to a user through channels. A channel can be data content available from a common source or data content having a common subject or theme. A user can subscribe separately to multiple channels. However, the multiple channels may have different methods for subscribing, such that the user has to take a separate action for each subscription. In addition, subscriptions to the multiple channels can be available on separate pages or applications, such that the user has to visit a different location for each subscription.

SUMMARY

In one embodiment, a method to perform a one-click subscription to multiple channels of information on a single topic is presented. A topic of interest is received via a user interface. A user interface element is presented via the user interface to facilitate a user subscription to a plurality of channels associated with the topic of interest without having to subscribe separately to each channel. A user selection of the user interface element is received and a user is subscribed to the plurality of channels in response to the received user selection.

In additional embodiments, computing devices for performing the operations of the above described embodiments are also implemented. Additionally, in embodiments of the disclosure, a computer readable storage media stores methods for performing the operations of the above described embodiments.

BRIEF DESCRIPTION OF THE DRAWINGS

The present disclosure will be understood more fully from the detailed description given below and from the accompanying drawings of various embodiments of the disclosure.

DETAILED DESCRIPTION

Embodiments of the disclosure pertain to easy subscribing to multiple channels of information on a single topic. A channel can be associated with a topic and can be data content available from a common source or data content having a common subject or theme. A user that is interested in a topic may want to subscribe to multiple channels related to the topic. The topic can be a subject, a source, or theme. For example, the topic can be a specific subject, such as musician, workout style, animal, writer, etc. or a general subject such as music, health, etc. In another example, the topic can be a source, such as a creator of the channel. In yet another example, the topic can be a theme, such as art, literature, etc. The multiple channels that a user may want to subscribe to may be of different types. The type of a channel can be based on a media type of the data content associated with the channel, a format of the data content associated with the channel, a source of the data content associated with the channel, an owner of the channel, a creator of the channel, a data content service associated with the channel, etc. For example, a user interested in a musician may want to subscribe to video channels that include the musician's music videos, audio channels that include the musician's music, a channel dedicated to fans of the musician, a channel that includes a blog about the musician, a channel that includes a newsletter about the musician, a channel that includes tweets of the musician, a channel that includes social network posts by or about the musician, etc.

Embodiments of the present disclosure allow a user to subscribe to multiple channels of information on a single topic. In some embodiments, a topic of interest is received, for example, from a user, and a plurality of channels associated with the topic of interest are identified. A user interface element is presented in a user interface to facilitate a user subscription to the plurality of channels associated with the topic of interest. In response to receiving a user selection of the user interface element (e.g., a user activation of a subscription button), a user is subscribed to the plurality of channels. In some embodiments, in response to receiving a subscription request associated with multiple channels, a type for each of the multiple channels is identified. At least some of the multiple channels may have different types. For example, for musician X, one channel can include videos by musician X and another channel can include posts from a blog about musician X. For each channel of the plurality of channels, a subscription procedure is identified for the channel based on the type of the channel. For each of the plurality of channels, the user is subscribed to the channel based on the subscription procedure for the channel.

Accordingly, aspects of the present disclosure allow a user to subscribe to multiple channels via a single click operation of the user (e.g., a single click of a check box presented on a graphical user interface (GUI) or an activation of a button presented on the GUI). In addition, according to some implementations of the present disclosure, if the multiple channels that the user is being subscribed to via the single click operation have different subscription procedures, the user does not need to be aware of these procedures. Rather, these procedures can be automatically (without any user involvement) determined and followed in response to the single click operation of the user.

Figure 1:
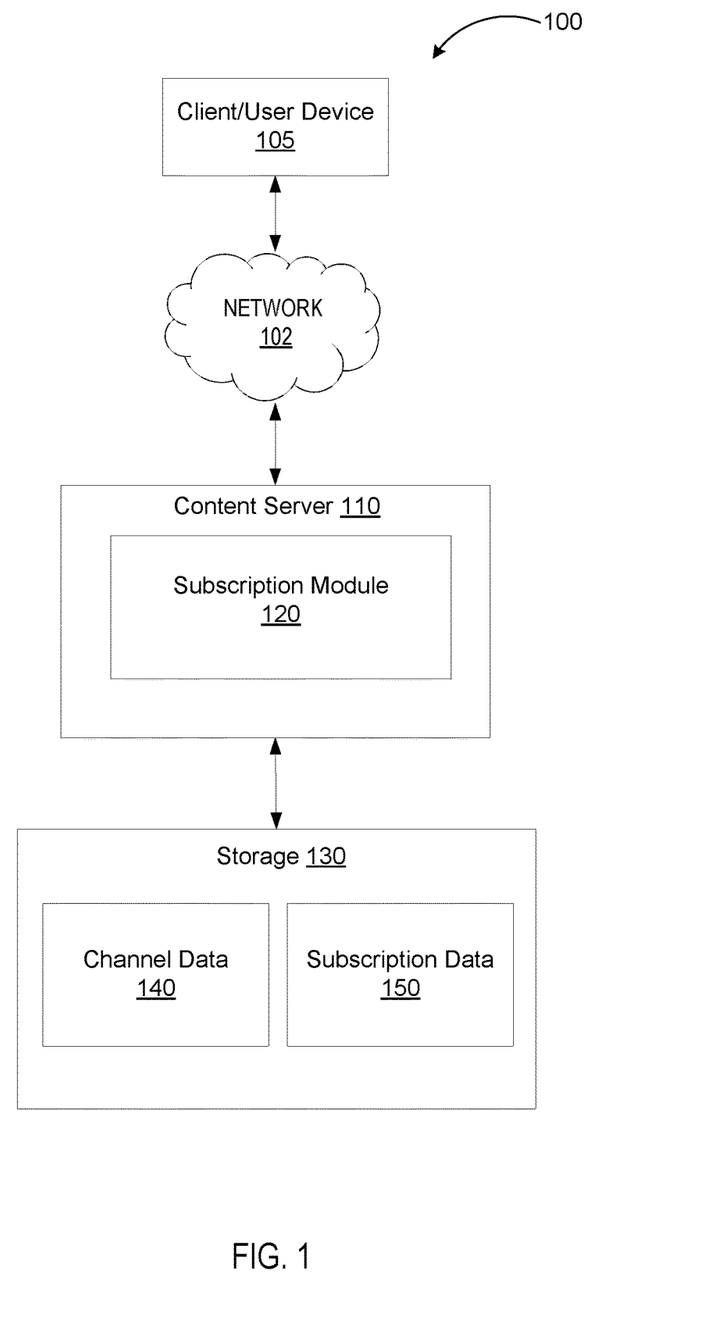
FIG. 1 illustrates an example system architecture, in accordance with one embodiment of the present disclosure.

FIG. 1 illustrates an example system architecture 100, in accordance with one embodiment of the present disclosure. System 100 comprises a client/user device 105 in communication with (e.g., coupled to) a content server 110 over a network 102, and a storage 130. The network 102 may be a private network (e.g., a local area network (LAN), a wide area network (WAN), intranet, etc.), a corporate network (e.g., a private network for an organization such as a corporation), a broadcast network, a public network (e.g., the Internet), a wired network (e.g., Ethernet network), a wireless network (e.g., an 802.11 network) and/or a cellular network (e.g., a Long Term Evolution (LTE) network).

The client/user device 105 may be any type of computing device, for example, a device including a processor, a computer-readable medium, and a memory. In some embodiments, the client/user device 105 may be executing a browser application or other application adapted to communicate over Internet related protocols (e.g., TCP/IP and HTTP) and/or display a user interface. While only a single client/user device 105 is shown in FIG. 1, system 100 may support a large number of concurrent sessions with many client/user devices 105.

The content server 110 may include computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine. Embodiments of the disclosure may operate within a single server device or on multiple server devices. Embodiments of the disclosure may operate as a standalone system.

In one embodiment, the content server 110 provides channels related to a topic to one or more of the client/user device 105. The topic can be, for example, a subject, a source, or theme. The content server 110 receives input from one or more of the client/user device 105 to subscribe a user of the client/user device 105 to multiple channels related to the topic. For example, the content server 110 may subscribe a user to channels related to a topic requested by the user upon receiving a request from the user on the client/user device 105 via the network 102.

Storage 130 can include one or more writable persistent storage devices, such as memories, tapes or disks. Although each of content server 110 and storage system 130 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

Storage 130 may include channel data 140 and subscription data 150. Channel data 140 may include identification information for various channels, such as an identifier of the channel (e.g., name), one or more identifiers (e.g., names) of data content associated with the channel (e.g., data content selected by an entity that owns the channel), and one or more topics associated with the channel (e.g., topics related to the data content associated with the channel). Subscription data 150 may include subscription data for users that can access channels identified in channel data 140 (e.g., registered users of a content hosting service). The subscription data 150 may include channels that a user has subscribed to, data content that the user has liked, topics the user is interested in, etc.

In embodiments of the disclosure, the content server 110 notifies end users of the types of information that are stored on storage 130, and provides the end users the opportunity to choose not to have such information collected, analyzed, and/or shared.

During operation of system 100, a user accesses system 100 via client/user device 105 over network 102. The content server 110 receives communications from the client/user device 105, and processes and/or directs these communications accordingly.

As discussed above, conventionally, Internet users can be provided multiple channels associated with a topic, with the multiple channels being of different types. The type of a channel can be based on a type of data content associated with the channel, a format of data content associated with the channel, a source of the data content associated with the channel, the owner of the channel, the creator of the channel, a data content service associated with the channel, etc. Typically, a user has to subscribe to each of these multiple channels separately. Embodiments of the present disclosure address this problem by subscribing the user to multiple channels of information on a topic in response to a single request, such as a selection of a subscribe user interface (UI) element (e.g., clicking on a subscribe button).

In particular, in one embodiment, when a user requests a subscription to multiple channels of different types, the content server 110 subscribes the user to the multiple channels. In one embodiment, the content server 110 includes a subscription module 120 that subscribes the user to multiple channels of information on a single topic using a single subscription click. In one embodiment the subscription module 120 can subscribe the user by receiving a topic of interest, identifying channels associated with the topic of interest, presenting a user interface element to facilitate a user subscription to the channels associated with the topic of interest, receiving a user selection or activation of the user interface element, and subscribing the user to each of the channels. The subscription module 120 can subscribe the user to each of the channels by identifying a type for each of the channels, identifying a subscription procedure for each channel based on the type of the channel, and subscribing the user to each channel based on the subscription procedure for the channel. In some embodiments, a type of one of the multiple channels associated with the subscription can be different than a type of another of the multiple channels associated with the subscription. In other embodiments, the topics include topics that are predefined.

The type of each of the multiple channels associated with the one click subscription can be identified using the channel data 140 stored in the storage system 130. In one embodiment, the channel data 140 includes information for each channel available to a content hosting service. The information for each channel available to the content hosting service can include an identifier for the channel (e.g., a name of the channel), one or more topics associated with the channel, and a type of the channel. For example, an official video channel Z for musician X is available to the content hosting service. In this example, the channel data 140 includes information for channel Z: an identifier Z, a topic of musician X, and a type of official channel with video data content. In another example, a user-generated audio channel A for musician Y is hosted by the content hosting service. In this example, the channel data 140 includes information for channel A: an identifier A, a topic of musician Y, and a type of user-generated channel with audio data content. In yet another example, a social media channel B for musician Y is available to the content hosting service but is associated with a social media service. In this example, the channel data 140 includes information for channel B: an identifier B, a topic of musician Y, and a type of the channel is external to the content hosting service because the social media service is associated with the channel. The subscription module 120 can compare an identifier for each of the channels associated with the subscription to the channel data 140 to determine the type of each channel. For example, if the subscription includes a channel Z, the subscription module 120 can compare Z to each identifier in the channel data 140 and determine that channel Z has a type of official channel.

The subscription module 120 can subscribe the user to each of the multiple channels based on a subscription procedure for the type of the channel. Each type of channel includes a subscription procedure, which is the procedure to follow in order to subscribe a user to the channel. In one embodiment, the subscription module 120 subscribes the user to each of the multiple channels by updating subscription data 150 in the storage system 130. The subscription data 150 may include the channels that one or more users associated with client or user device 105 are subscribed to. The subscription module 120 can update the subscription data 150 for the user to include an identifier of each of the multiple channels associated with the subscription. For example, if the subscription requested by user X included channels Y and Z, and user X was not previously subscribed to channels Y and Z, the subscription data in subscription 150 that is associated with user X will be updated to include the identifiers for channels Y and Z.

In one embodiment, the subscription module 120 subscribes the user to each of the multiple channels based on a subscription procedure for the type of the channel by determining the subscription procedure for the type of channel and subscribing the user to the channel based on the subscription procedure for the channel. For example, a channel that is associated with a social media service that is external to a content hosting service requires a subscription request to be sent to the social media service in order to subscribe a user to the channel. In one embodiment, the subscription module 120 can determine whether the subscription procedure for any of the types of channels requires an external request. In one embodiment, the subscription procedure requires an external request if the type of the channel is external to a content hosting service (not shown) associated with the content server 110. The type of a channel can be external to the content hosting service associated with the content server 110 if the media type of the data content associated with the channel is not supported by or available to the content hosting service associated with the content server 110, if the format of the data content associated with the channel is not supported by or available to the content hosting service associated with the content server 110, if the source of the data content is not associated with the content hosting service, if the owner of the channel is not associated with the content hosting service associated with the content server 110, if the creator of the channel is not associated with the content hosting service associated with the content server 110, if the content hosting service associated with the content server 110 does not host the channel or collection of channels, etc.

If the subscription module 120 determines that the subscription procedure for the channel requires an external request, the subscription module 120 generates the external request to subscribe a user to the channel and provides the external request to the an external service (not shown) associated with the type of the channel.

Figure 2:
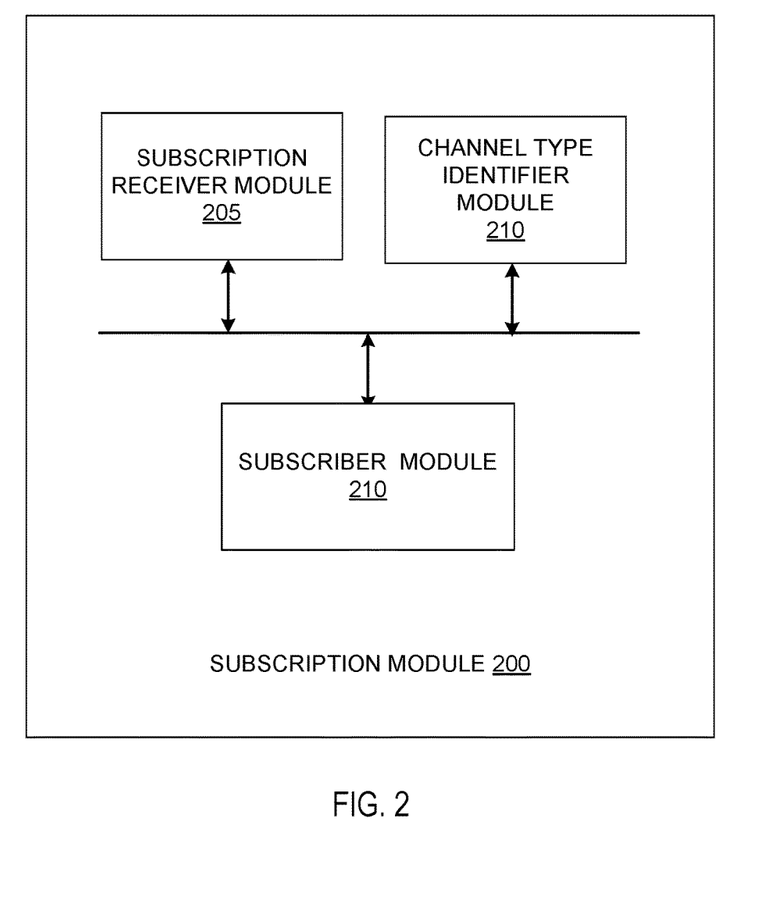
FIG. 2 illustrates a subscription module, in accordance with one embodiment of the present disclosure.

FIG. 2 illustrates a subscription module 200, in accordance with one embodiment of the present disclosure. The subscription module 200 may include subscription receiver module 205, a channel type identifier module 210, and a subscriber module 215. More or less components may be included in the channel subscribability module 200 without loss of generality.

The subscription receiver module 205 may receive a request for a topic of interest and can identify multiple channels associated with the topic of interest. The one-click subscription receiver module 205 can present a user interface element to facilitate a user subscription to two or more of the multiple channels associated with the topic of interest. The subscription receiver module 205 can receive a user selection of the user interface element to subscribe a user to at least two channels of the multiple channels. The subscription receiver module 205 can determine information from the request to subscribe to multiple channels by parsing information included in the user selection of the user interface element. In one embodiment, the information includes an identifier for each channel (e.g., name of the channel) and an identifier of a user (e.g., name, password, etc.) associated with the request. In one embodiment, the information further includes the user topic associated with the multiple channels.

Based on the above information, the channel type identifier module 210 can identify a type of each of the channels indicated in the request. The type of a channel can identify a media type of data content associated with the channel, a format of data content associated with the channel, a source of the data content associated with the channel, the owner of the channel, the creator of the channel, a service (e.g., social media service) associated with the channel, etc. In one embodiment, the channel type identifier module 210 identifies the type of each of the channels identified in the information using the channel data 140 in storage 130, shown in FIG. 1. In another embodiment, the channel type identifier module 210 obtains the type of each of the channels from other computing devices (e.g., other servers not shown in the figures, such as a datacenter) via a network (e.g., network 102 shown in FIG. 1) or may obtain the type of each of the channels from a memory (e.g., a hard disk, flash memory, random access memory (RAM), etc.).

The subscriber module 215 may identify a subscription procedure for the channel based on the type of the channel and subscribe the user to each of the channels associated with the user selection based on the subscription procedure for the type of the channel. For example, a user selection includes channels A and B, with channel A being of type C and channel B being of type D, the subscription procedure for a channel type C requires modifying the subscription information of a user to include the channel and an external request to be sent to an external social media service, and the channel type D requires modifying the subscription information of the user to include the channel. In this example, the subscriber module 215 will subscribe the user to channel A by modifying the subscription information of the user to include channel A and sending an external request to the external social media service, and the subscriber module 215 will subscribe the user to channel B by modifying the subscription information of the user to include channel B.

In one embodiment, the subscriber module 215 subscribes the user to the multiple channels by modifying the subscription information associated with the user to include the identifier for each of the channels associated with the user selection. In one embodiment, the subscriber module 215 modifies the subscription information associated with the user by updating the subscription data 150 in storage 130, shown in FIG. 1. In an alternate embodiment, the subscriber module 215 modifies the subscription information associated with the user by updating subscription data in another computing device (e.g., other servers not shown in the figures, such as a datacenter) via a network (e.g., network 102 shown in FIG. 1) or may update the subscription data in a memory (e.g., a hard disk, flash memory, random access memory (RAM), etc.).

In one embodiment, the subscriber module 215 subscribes the user to each of the multiple channels based on the subscription procedure for the channel based on the type of the channel by determining whether the subscription procedure for a channel associated with the user selection requires an external request. If the subscription procedure for a channel associated with the user selection requires an external request, the subscriber module 215 generates the external request for subscription to the channel to provide to the external site associated with the type of the channel. In some embodiments, the subscriber module 215 provides each of the requests to the appropriate external service associated with the type of the channel.

Figure 3A:
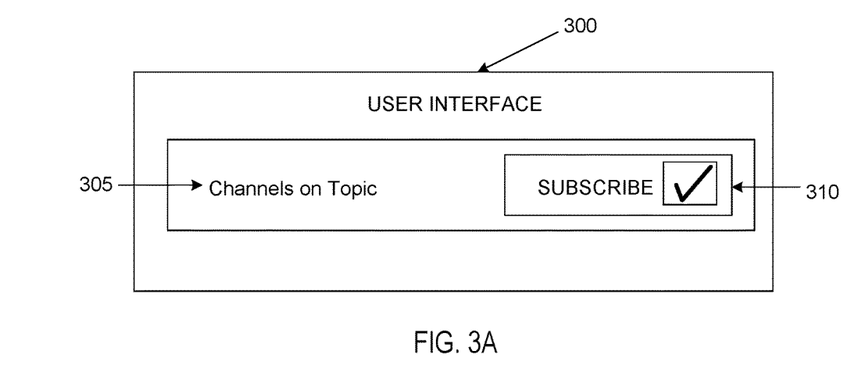
FIG. 3A illustrates a user interface, in accordance with one embodiment of the present disclosure.

FIG. 3A is an example user interface 300 in accordance with one embodiment of the present disclosure. For example, the user can be presented with the user interface 300 in response to a user searching for the topic of interest on a content hosting service. In another example, the user can be presented with the user interface 300 in response to the user providing the topic of interest in a subscription wizard. In yet another example, the user can be presented with the user interface 300 in response to the user providing the topic of interest in a subscription guide. In yet another example, the user can be presented with the user interface 300 when the user chooses to view subscribable channels about a predefined topic. The user interface 300 can be provided to a user on a web page, in an application, embedded in a third party web page, etc.

The user interface 300 includes channels on topic 305 and a user interface element 310. The user interface element 310 can be a check box, a button, or any other graphic representation of a subscription. The channels on topic 305 can include the name of the topic of interest received from a user. For example, if a user searched for musician X, channels on topic 305 is "Channels on Musician X". The channels on topic 305 may include a link to the list of channels on the topic of interest, or be associated with channels on the topic of interest in any other way. In one embodiment, the channels on topic 305 is associated with at least two channels, and a type of one of the channels is different than a type of another of the channels. For example, if the user searched for musician X, and user X has a music video channel A, a blog associated with channel B, and a social media service channel C, the channels on topic 305 will be associated with channel A, channel B, and channel C, where the channels are each of a different type (music video channel vs. blog vs. social media service channel).

The user interface element 310 is presented in user interface 300 and provides a representation for the user to subscribe to the multiple channels (e.g., all channels) associated with the user topic. The user interface element 310 can be any graphic representation of a subscription, such as a button, a radio button, a check box, or any other control element In one embodiment, the user interface element 310 includes a check box and the text "Subscribe", which informs the user that by clicking a single (e.g., one) time on the user interface element 310, the user will be subscribed to the multiple channels on topic 305. Upon clicking the user interface element 310 once, the user can be subscribed to all of the channels on topic 305. The checkmark may have the same or different color than the text. It should be understood that in other embodiments, other graphic representations and/or text can be presented to a user to provide the user a way to subscribe to the channels on a topic 305 with one click.

Figure 3B:
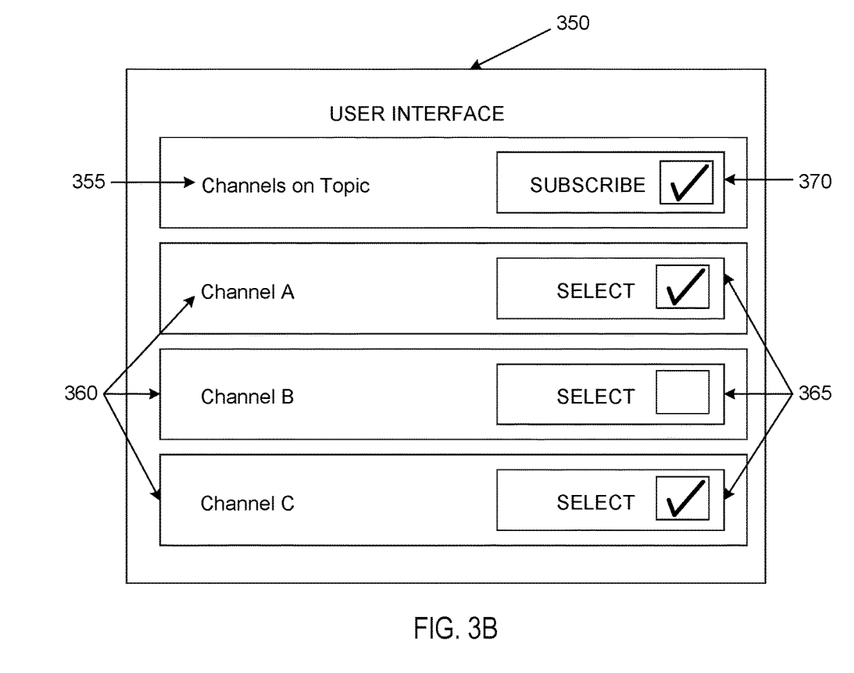
FIG. 3B illustrates a user interface, in accordance with another embodiment of the present disclosure.

FIG. 3B is an example user interface 350 in accordance with one embodiment of the present disclosure. The user interface 350 is presented to a user of a content hosting service in response to a user indicating a topic of interest. For example, the user can be presented with the user interface 350 in response to a user searching for the topic on a content hosting service. In another example, the user can be presented with the user interface 350 in response to the user providing the topic in a subscription wizard. In yet another example, the user can be presented with the user interface 350 in response to the user providing the topic in a subscription guide. In yet another example, the user can be presented with the user interface 350 in response to a request for channels on a specified topic. In yet another example, the user can be presented with the user interface 350 when the user chooses to view subscribable channels about a predefined topic. The user interface 350 can be provided to a user on a web page, in an application, embedded in a third party web page, etc.

The user interface 350 includes channels on topic 355, multiple channels 360, a select user interface element such as a check box 365 for each of the multiple channels 360, and a subscribe user interface element 370. The channels on topic 355 can include the name of the topic received from the user. For example, if a user searched for musician X, channels on topic 355 is "Channels on Musician X".

Channels on topic 355 is associated with multiple channels 360. Multiple channels 360 can include the channel name for each of the multiple channels 360. Multiple channels 360 can, for example, include three channels on topic 355: Channel A, Channel B, and Channel C.

Each of the multiple channels 360 can have a corresponding select check box 365. Each of the select check boxes 365 provides an indication for the user to select whether the user would like to be subscribed to the corresponding channel 360 when the subscribe user interface element 370 is clicked. In one embodiment, when the user interface on topic 350 is presented to the user, all of the check boxes 365 are selected (e.g., include a checkmark or a cross). In an alternate embodiment, when the user interface on topic 350 is presented to the user, one or more of the check boxes 365 are not selected (e.g., do not include a checkmark). Referring to the user interface on topic 350, the select check box 365 corresponding to Channel A of the multiple channels 360 is selected, the select check box 365 corresponding to Channel B of the multiple channels 360 is not selected, and the select check box 365 corresponding to Channel C of the multiple channels 360 is selected.

The subscribe user interface element 370 is presented in user interface 350 and provides a representation for the user to subscribe to the multiple channels 360 that have a corresponding select box 365 that is selected (e.g., includes a checkmark or a cross). The user interface element 370 includes a checkmark and the text "Subscribe", which informs the user that by clicking a single (e.g., one) time on the subscribe user interface element 370, the user will be subscribed to all of the multiple channels 360 that are selected using the corresponding select check box 365. The select check box may have the same or different color than the text. It should be understood that in other embodiments, other graphic representations and/or text can be presented to a user to provide the user a way to subscribe to the channels on a topic 305 with one click. Upon clicking the subscribe user interface element 370 once, the user can be subscribed to the multiple channels 360 that are selected using the corresponding select check box 365. Referring to the user interface on topic 350, upon clicking on the subscribe user interface element 370, the user will be subscribed to Channel A and Channel C because the select check boxes 365 corresponding to those channels are selected.

Figure 4:
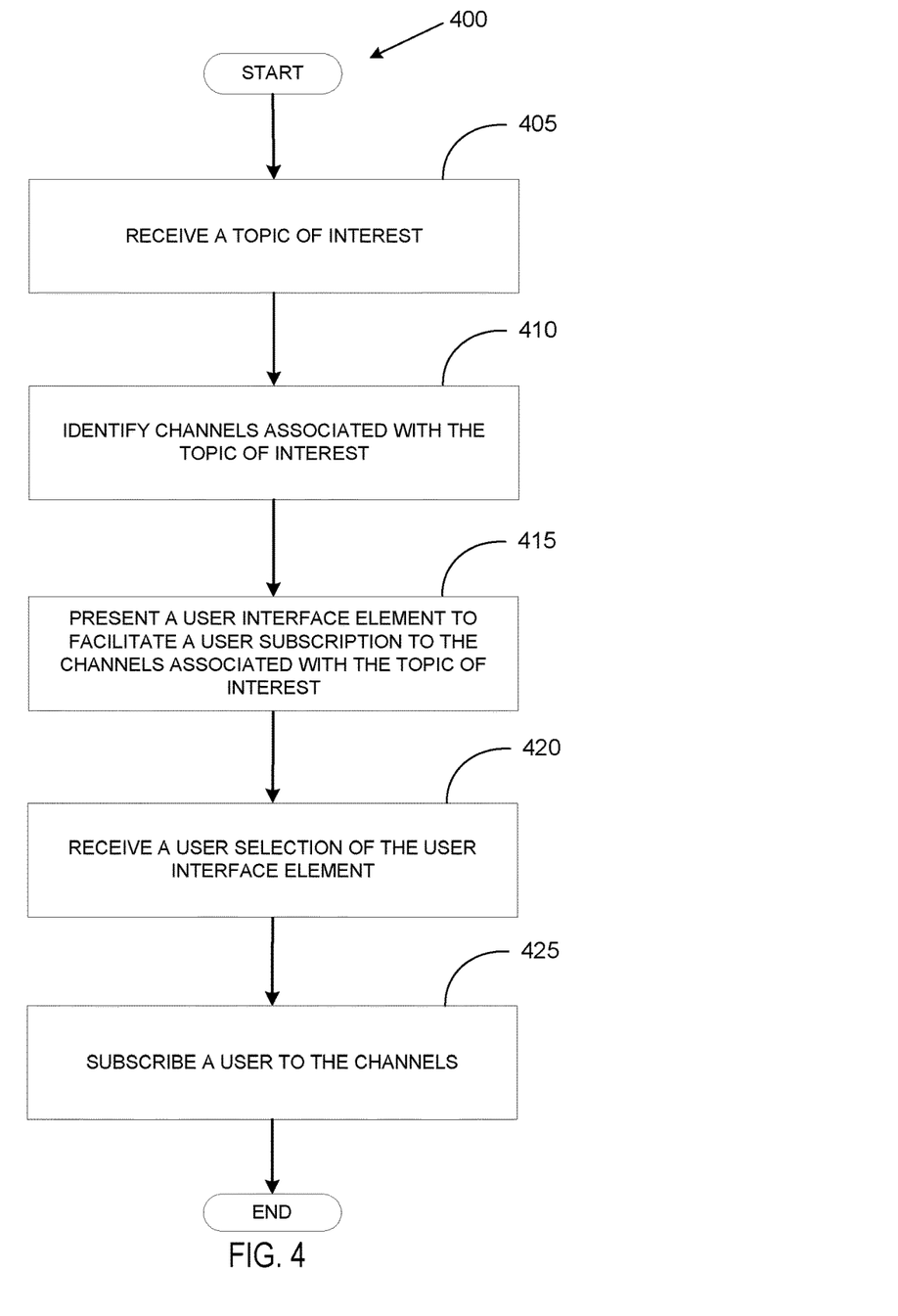
FIG. 4 is a flow diagram illustrating one embodiment for a method of subscribing to multiple channels of information, in accordance with one embodiment of the present disclosure.

FIG. 4 is a flow diagram illustrating an embodiment for a method 400 of subscribing to multiple channels of information. The method 400 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 400 is performed by a server (e.g., the content server 110 of FIG. 1).

At block 405, processing logic receives a topic of interest. In one embodiment, the topic of interest is received in a user interface. The topic of interest can be submitted by a user in a search field, a subscription generator, a subscription wizard, etc. For example, a user searches for channels about a musician X in a subscription generator because the user is interested in subscribing to channels related to musician X. The topic of interest can be submitted by a service, such as a content provider service, a social media service, etc. In other embodiments, the topic of interest is predefined and is chosen by the user.

At block 410, processing logic identifies channels associated with the topic of interest. In one embodiment, processing logic identifies the channels associated with the topic of interest in response to a user request for the topic. In an alternate embodiment, processing logic identifies the channels associated with the topic of interest on a periodic basis (e.g., every hour, every day, every week, etc.). In another alternate embodiment, processing logic identifies the channels associated with the topic of interest in response to data content associated with the topic being associated with (e.g., uploaded to, added to, selected by, etc.) a channel. For example, if data content related to topic X is uploaded to a channel Y, processing logic will identify channel Y and any other channels associated with topic X in response to the data content related to topic X being uploaded to channel Y.

In one embodiment, processing logic identifies the channels associated with the topic by receiving the channels from a content hosting service, a computing system, a content server, etc. In an alternate embodiment, processing logic identifies the channels associated with the topic by requesting the channels from a content hosting service, a computing system, a content server, etc. In another alternate embodiment, processing logic identifies the channels using machine learning techniques. The machine learning techniques may be based on a subscribability score associated with each of the channels. In yet another embodiment, processing logic identifies the channels by obtaining subscription information associated with the user requesting the topic of interest and determining the channels based on the subscription information of the user and the topic of interest. In one embodiment, processing logic determines the channels based on the subscription information and the topic of interest by determining channels associated with the topic of interest that other users with similar subscription information are subscribed to, and identifying the channels that other users are subscribed to that the user requesting the topic of interest is not subscribed to. For example, user X requests a topic Q and is subscribed to channel A on topic R and channel B on topic Q, user Y is subscribed to channel C on topic Q and channels A and B, and user Z is subscribed to channel D on topic Q and channel A. In this example, processing logic identifies channels C and D on topic Q based on users Y and Z having subscription information that is similar to user X (subscription to channels A and B). In some embodiments, the channels are identified by a user or an administrator and provided to a computing system, a content server, etc.

At block 415, processing logic presents, in a user interface, a topic of interest and a user interface element to facilitate a user subscription to the channels associated with the topic of interest (user topic). The user interface element can be a button, a check box, or any other control element that facilitates a user subscription to the channels associated with the topic of interest. In one embodiment, the user interface further includes a list of the channels associated with the topic. An example user interface that includes a list of the channels is discussed above in conjunction with FIG. 3B. In an alternate embodiment, the user interface does not include a list of the channels, but rather an indication that the topic of interest is associated with multiple channels. An example user interface that does not include a list of the channels is discussed above in conjunction with FIG. 3A.

At block 420, processing logic receives a subscription request that may be issued in response to a selection of the user interface element. In one embodiment, the user interface element is selected by a user via the user interface (UI) to subscribe to the multiple channels. In an alternate embodiment, the user interface element is selected by a content hosting service on behalf of a user logged into the content hosting service when the user performs a certain operation (e.g., using a subscription builder, a subscription wizard, in response to a user requesting a topic, etc.). In one embodiment, the selection of the user interface element is performed via a single (one) click on a UI (e.g., graphical user interface (GUI)) element for a subscription to the multiple channels. In some embodiments, the user selection of the user interface element is received when a user clicks on a link (e.g., URL), a graphic representation of the subscription (e.g., picture), or any other UI element.

In one embodiment, the subscription request is associated with at least two of the identified channels associated with the topic of interest, with a first one of the channels being of a type that is different than a type of a second one of the channels. A channel can be data content available from a common source or data content having a common topic or theme. The subscription request can include an identifier for each channel associated with the subscription request and an identifier of a user associated with the subscription request. In one embodiment, the subscription request is further associated with the topic of interest.

At block 425, processing logic subscribes a user to the channels associated with the subscription request. Processing logic can subscribe a user to the channels by identifying a type for each of the channels associated with the subscription request, identifying a subscription procedure for each channel based on the type of the channel, and subscribing a user to the channel based on the subscription procedure for the channel.

In one embodiment, the type of a channel is defined based on a media type of data content associated with the channel. For example, if a channel has video content on it, the type of the channel is video. In one embodiment, the type of a channel is defined based on a format of data content associated with the channel. For example, if content on the channel is MP3 files, the type of the channel is MP3. In one embodiment, the type of a channel is based on a method for subscribing to the channel. For example, if the method of subscribing to the channel is through an API, the type of the channel is API.

In one embodiment, the type of a channel is defined based on the owner of the channel. For example, if the channel is owned by a user, the type of the channel is user or an identifier of the user (e.g., name of the user). In another example, if the channel is owned by a social media service, the type of the channel is social media or an identifier of the social media service (e.g., name of the social media service). In one embodiment, the type of the channel is defined based on a service associated with the channel. For example, if the channel is associated with a social media service, the type of the channel is social media service or an identifier of the social media service (e.g., name of the social media service).

In one embodiment, the type of a channel is defined based on the service, the creator or the generator of the channel. For example, if the channel was created by a content hosting service, the type of the channel is content hosting service or an identifier of the content hosting service (e.g., name of the content hosting service). In this embodiment, the type of a channel can be a user generated channel, an algorithmically generated channel, an official channel, a third party channel, etc.

A channel that is user generated can be a channel that has been generated by a user, such as a user of a content hosting service. The user generated channel can be a brand user controlled channel or a user controlled channel. The brand user controlled channel can include data content (e.g., video, audio, newsletter, blog, etc.) uploaded to a content hosting service by a user using an external API (e.g., data API, etc.). The user controlled channel can include data content (e.g., video, audio, newsletter, blog, etc.) uploaded by a user directly to a content hosting service.

An algorithmically generated channel can be a channel that has been algorithmically generated by a content hosting service on a topic. The algorithmically generated channel can include data content (e.g., video, audio, newsletter, blog, etc.) on the topic selected from other channels on the content hosting service using an algorithm. In one embodiment, the algorithm is a machine learning algorithm that selects the data content based on searches performed on the content hosting service (e.g., data content selected by users searching for the topic on the content hosting service, etc). In one such embodiment, in response to a search on a topic, a list of results is returned by the content hosting service, data content is selected by the user from the list of results, and the machine learning algorithm learns which data content is selected from the search results and includes that data content in the algorithmically generated channel on the topic. For example, a machine learning algorithm learns that data content X on channel Y should be included for topic Z. In this example, data content Y from channel Y will be included in an algorithmically generated channel on topic Z. In an alternate embodiment, the algorithm selects the data content based on the subscribability of a channel that includes data content on a topic. The subscribability of a channel can measure how worthwhile it is for a user to subscribe to the channel, and can be represented by a subscribability score. In one such embodiment, the algorithm selects data content that is associated with a channel with a high subscribability score. For example, if data content A on channel X is related to topic Z and data content B on channel Y is related to topic Z, and channel X has a higher subscribability than channel Y, the algorithm selects data content A on channel X to include in the algorithmically generated channel on topic Z.

An official channel can be a channel that is controlled or owned by an entity directly associated with a topic. For example, for a topic related to a singer (e.g., a music video for the singer), the official channel is controlled or owned by the singer or a representative of the singer (e.g., record label, etc.).

A third party channel can be a channel that is external to a content hosting service, such as a social media service, a social networking service, a virtual world, etc. For example, a third party channel for a singer X is a blog written by singer X, a page created by singer X on a social networking service, an avatar created and controlled by singer X, etc.

To identify a type of the channel, processing logic can compare an identifier for each of the channels associated with the subscription request with identifiers of predefined channels and if an identifier of the channel matches an identifier of any predefined channel, processing logic can obtain the corresponding type of the predefined channel that matches the identifier. In some embodiments, the predefined channels are channels hosted by a content hosting service that receives the subscription request and/or channels hosted by services external to the content hosting service that are accessible to the content hosting service. For example, if the subscription request is associated with channel A and channel B, and the predefined channels include channel A, channel B, and channel C, processing logic will obtain the types of channel A and channel B from the available channels.

For each of the channels associated with the subscription request, processing logic can identify a subscription procedure for the channel based on the type of the channel. The subscription procedure for a type of channel can describe one or more requirements for subscribing to a channel of that type. For example, a channel that is associated with a social media service that is external to a content hosting service requires a subscription request to be sent to the social media service in order to subscribe a user to the channel. Processing logic can follow the requirements in the subscription procedure for each channel in order to subscribe a user to the channel. Using the previous example, processing logic can generate a subscription request to subscribe the user to a channel associated with the social media service and provide the subscription request to the social media service in order to subscribe the user to the channel.

In one embodiment, as part of the subscription procedure, processing logic subscribes the user to each of the channels associated with the subscription request by updating subscription data associated with the user. The subscription data associated with the user may identify the channels that the user is subscribed to. Processing logic can update the subscription data associated with the user by including an identifier (e.g., name) of each channel associated with the subscription request. In one embodiment, as part of the subscription procedure, processing logic can determine whether the subscription procedure for each of the channels associated with the subscription request requires an external request based on the subscription procedure for the types of channels. In one embodiment, the subscription procedure requires an external request if the type of the channel is external to a content hosting service. Processing logic can determine that the type of the channel is external to the content hosting service if the media type of the data content associated with the channel is not supported by or available to the content hosting service, if the format of the data content associated with the channel is not supported by or available to the content hosting service, if the subscription procedure is not supported by or available to the content hosting service, if the owner of the channel is not associated with the content hosting service, if the creator of the channel is not associated with the content hosting service, if the content hosting service does not host the channel or collection of channels, if the service associated with the channel is a service other than the content hosting service, etc. For example, if a channel X is associated with a social media service, processing logic determines that the type of the channel is external to the content hosting service.

If processing logic determines that the subscription procedure for a channel requires an external request based on the subscription procedure for the type of the channel, processing logic can generate an external request to subscribe a user to the channel. In one embodiment, the external request to subscribe to the channel includes an identifier of the channel and additional information based on the type of the channel. In one embodiment, if the type of the channel is a social media service, the external request includes a subscription command that is specific to the social media service and an authorization token to verify the user and/or perform an action on behalf of the user. In one embodiment, the authentication token is generated using authentication information previously provided by the user to log into the content hosting service. If the authentication token is not available, processing logic can request authentication information from the user in order to perform the subscription. For example, processing logic requests a username and password from the user. In some embodiments, processing logic provides the external request to subscribe to the channel to an external service associated with the channel such that the external service can perform the subscription to the channel. For example, if a channel X is associated with a social media service, processing logic provides the request to subscribe to channel X to the social media service.

In some embodiments, once processing logic subscribes the user to the channel based on the type of the channel, processing logic can further update an activity feed presented to the user to include information about the channel. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user.

Figure 5:
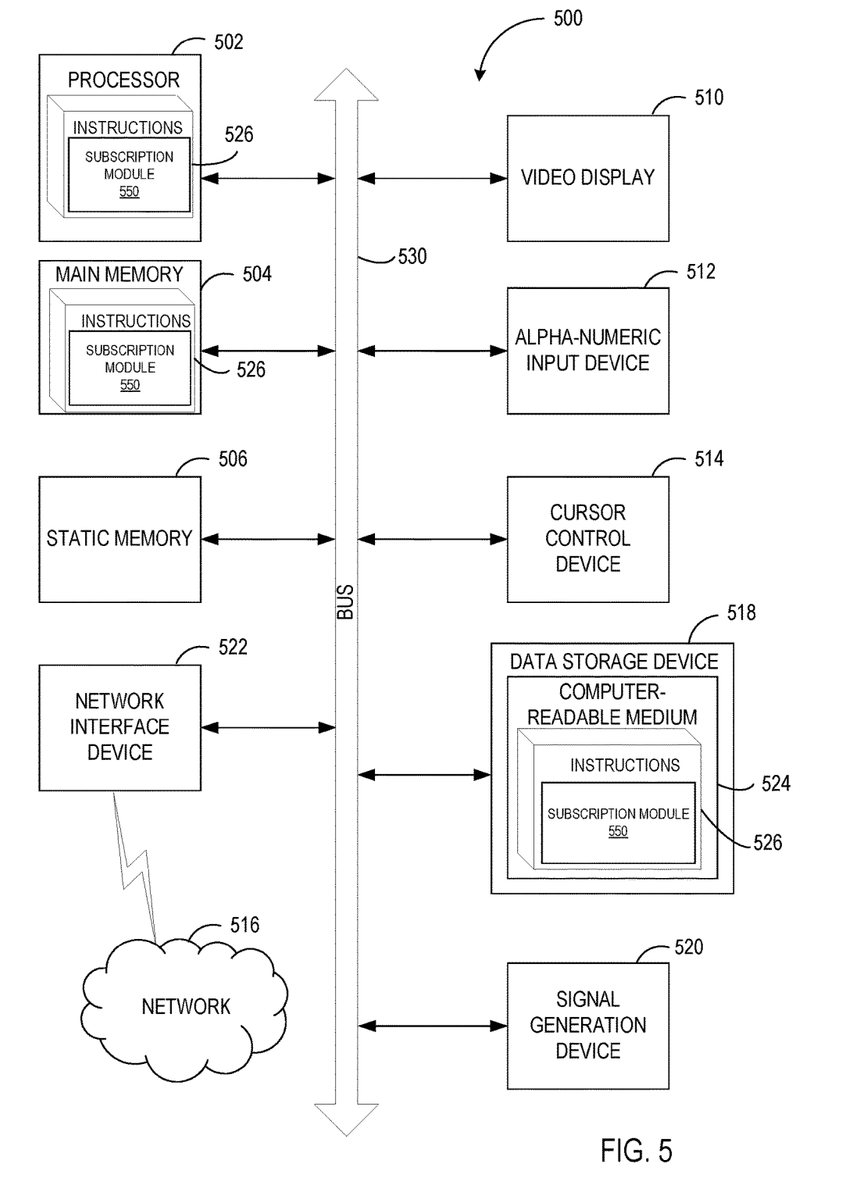
FIG. 5 is a block diagram of an exemplary computer system that may perform one or more of the operations described herein.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 516 via the network interface device 522.

In one embodiment, the instructions 526 include instructions for a subscription module 550, which may correspond to subscription module 120 of FIG. 1, and/or a software library containing methods that subscribes a user to multiple channels of information using one click. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying", "presenting," "receiving," "modifying", "subscribing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

We claim:

1. A computer implemented method comprising:
    identifying, by a processing device, a plurality of channels associated with a topic of interest of a user, wherein the plurality of channels comprise subscribable channels that are without a subscription by the user;
    providing a user interface that presents the plurality of channels and comprises a single user interface element to facilitate user subscriptions to at least two of the plurality of channels, wherein the at least two of the plurality of channels comprise a first channel and a second channel;
    determining, by the processing device, a first subscription instruction set corresponding to the first channel and a second subscription instruction set corresponding to the second channel; and
    responsive to receiving a user selection of the single user interface element, executing the first subscription instruction set and the second subscription instruction set to subscribe the user to the at least two of the plurality of channels.

2. The method of claim 1, further comprising:
    identifying a type for each of the plurality of channels, wherein a type of one of the plurality of channels is different than a type of another of the plurality of channels;
    for each of the plurality of channels, identifying a subscription procedure for the channel based on the type of the channel, wherein the subscription procedure comprises a subscription instruction set; and
    for each channel of the at least two channels, subscribing the user to the channel based on the subscription procedure for the channel.

3. The method of claim 2, wherein the type of one of the plurality of channels is based on at least one of: a type of data content associated with the channel, a format of data content associated with the channel, a source of the data content associated with the channel, an owner of the channel, a creator of the channel, and a data content service associated with the channel.

4. The method of claim 2, further comprising:
    upon determining that the first channel is associated with a content hosting service, modifying subscription information of the content hosting service that is associated with the user to comprise data associated with the first channel; and
    upon determining that the second channel requires an external request, generating the external request for subscription to the second channel to be provided to service external to the content hosting service.

5. The method of claim 1, wherein the user interface comprises a list of the plurality of channels.

6. The method of claim 5, wherein presenting the user interface element further comprises:
    presenting a checkbox for each channel in the list of the plurality of channels; and receiving a user selection associated with at least two checkboxs.

7. The method of claim 1, wherein the user interface is absent a list of the plurality of channels.

8. The method of claim 1, further comprising identifying a plurality of channels associated with the topic of interest.

9. The method of claim 1, wherein the first channel is provided by a content hosting service and the second channel is provided by a service external to the content hosting service and, wherein the first subscription instruction set comprises an operation transmitting a subscription request to the content hosting service and the second subscription instruction set comprises an operation transmitting a subscription request to the service external to the content hosting service.

10. A non-transitory computer readable storage medium having instructions that, when executed by a processing device, cause the processing device to perform operations comprising:
identifying a plurality of channels associated with a topic of interest of a user wherein the plurality of channels comprise subscribable channels that are without a subscription by the user;
providing a user interface that presents the plurality of channels and comprises a single user interface element to facilitate user subscriptions to at least two of the plurality of channels, wherein the at least two of the plurality of channels comprise a first channel and a second channel;
determining, by the processing device, a first subscription instruction set corresponding to the first channel and a second subscription instruction set corresponding to the second channel; and
responsive to receiving a user selection of the single user interface element, executing the first subscription instruction set and the second subscription instruction set to subscribe the user to the at least two of the plurality of channels.

11. The non-transitory computer readable storage medium of claim 10, wherein the instructions, when executed by the processing device, cause the processing device to perform further operations comprising receiving, via the user interface, user input indicating the topic of interest.

12. The non-transitory computer readable storage medium of claim 11, wherein the user interface comprises a list of the plurality of channels.

13. The non-transitory computer readable storage medium of claim 11, wherein the user interface is absent a list of the plurality of channels.

14. The non-transitory computer readable storage medium of claim 10, wherein the instructions, when executed by the processing device, cause the processing device to perform further operations comprising, receiving a user selection of the user interface element to facilitate user subscriptions to all of the plurality of channels associated with the topic of interest.

15. The non-transitory computer readable storage medium of claim 10, wherein each of the plurality of channels comprises a type of a channel that is based on at least one of: a type of data content associated with the channel, a format of data content associated with the channel, a source of the data content associated with the channel, an owner of the channel, a creator of the channel, and a data content service associated with the channel.

16. The non-transitory computer readable storage medium of claim 10, wherein to subscribe the user to at least two of the channels, the processing device is to perform operations comprising:
upon determining that the first channel is associated with a content hosting service, modifying subscription information of the content hosting service that is associated with the user to comprise data associated with the first channel; and
upon determining that the second channel requires an external request, generating the external request for subscription to the second channel to be provided to service external to the content hosting service.

17. A computing device comprising:
a memory; and
a processing device coupled to the memory, wherein the processing device is configured to:
identify a plurality of channels associated with a topic of interest of a user wherein the plurality of channels comprise subscribable channels that are without a subscription by the user;
provide a user interface presenting the plurality of channels and comprises a single user interface element to facilitate a user subscriptions to at least two of the plurality of channels, wherein the at least two of the plurality of channels comprise a first channel and a second channel;
determine a first subscription instruction set corresponding to the first channel and a second subscription instruction set corresponding to the second channel; and
responsive to receiving a user selection of the single user interface element, executing the first subscription instruction set and the second subscription set to subscribe the user to the at least two of the plurality of channels.

18. The computing device of claim 17, wherein the processing device is further configured to:
identify a type for each of the plurality of channels, wherein a type of one of the plurality of channels is different than a type of another of the plurality of channels;
for each of the plurality of channels, identify a subscription procedure for the channel based on the type of the channel, the subscription procedure comprising a subscription instruction set; and
for each channel of the at least two channels, subscribe the user to the channel based on the subscription procedure for the channel.

19. The computing device of claim 18, wherein the type of one of the plurality of channels is based on at least one of: a type of data content associated with the channel, a format of data content associated with the channel, a source of the data content associated with the channel, an owner of the channel, a creator of the channel, and a data content service associated with the channel.

20. The computing device of claim 18, wherein the processing device is further to:
upon determining that the first channel is associated with a content hosting service, modify subscription information of the content hosting service that is associated with the user to comprise data associated with the first channel; and
upon determining that the second channel requires an external request, generate the external request for subscription to the second channel to be provided to a service external to the content hosting service.

\* \* \* \* \*